United States Patent Office 3,751,496
Patented Aug. 7, 1973

3,751,496
PROCESS FOR PREPARING DICHLOROBUTENE
Naoyuki Todo, Tokyo, Hiroyuki Hagiwara, Funabashi-shi, and Minoru Kurita and Toshio Sato, Tokyo, Japan, assignors to Agency of Industrial Science & Technology, Tokyo, Japan
No Drawing. Filed Aug. 7, 1969, Ser. No. 848,346
Claims priority, application Japan, Aug. 7, 1968, 43/55,501
Int. Cl. C07c 21/00
U.S. Cl. 260—654 A
9 Claims

ABSTRACT OF THE DISCLOSURE

A process for preparing dichlorobutene which comprises reacting together butadiene, hydrogen chloride and oxygen at a temperature of 80° C. to 300° C. in the presence of a catalyst consisting of a copper salt, phosphoric acid and an alkali chloride or of a copper salt and an alkali metal phosphate which catalyst is supported on a carrier.

---

This invention relates to a process for preparing dichlorobutene. More particularly, this invention relates to a process for preparing 3,4-dichlorobutene-1 and 1,4-dichlorobutene-2, compounds useful as raw materials for the production of chloroprene, by oxychlorinating butadiene with hydrogen chloride and oxygen.

The commercial processes for the production of chloroprene presently used can be roughly classified as the acetylene method and the butadiene method. The butadiene method comprises chlorinating butadiene in the gaseous state to produce dichlorobutene, and isomerizing and dehydrochlorinating the resulting dichlorobutene to produce the desired chloroprene, and is more economical than the acetylene method. However, the butadiene method has a defect in that hydrochloric acid is produced as a by-product in the step of dehydrochlorination.

The principal object of this invention is to provide a process for preparing dichlorobutene in high yield.

Another object of this invention is to provide a process for preparing dichlorobutene by directly using hydrogen chloride. Accordingly, the process of this invention is economical since the by-product hydrochloric acid produced in the conventional method can be utilized by substituting the process of this invention for the chlorination step in the conventional chloroprene production.

A further object of this invention is to provide a process for selectively preparing, in accordance with the application to be made, 3,4-dichlorobutene-1 or 1,4-dichlorobutene-2 in high yield and with high selectivity.

The present inventors carried out a search for a catalyst which would remain highly active and make possible the production of dichlorobutene in high yield and with high selectivity by inhibiting the formation of chlorobutene as a by-product due to an addition reaction of hydrogen chloride and also by inhibiting the formation of carbon monoxide and carbon dioxide due to calcination of butadiene. As a result, they found that a catalyst consisting of a copper salt, and either alkali metal phosphate or phosphoric acid and an alkali metal chloride being supported on a carrier, is highly effective for such a purpose.

When butadiene, hydrogen chloride and oxygen are reacted together in the presence of one of the above catalysts at a temperature of about 80° C. to about 300° C. under the condition of S.V. 210, the butadiene is chlorinated to yield a product consisting mainly of 1,4-dichlorobutene-2 and 3,4-dichlorobutene-1.

The copper salt used in the catalyst can be any one of the group of copper chloride, copper sulfate and copper nitrate, but the best result is obtained by using copper chloride.

For the phosphate of an alkali metal, a potassium salt such as $K_3PO_4$, $KH_2PO_4$, $KHPO_4 \cdot 4H_2O$ or the like, a sodium salt such as $NaHPO_4 \cdot 12H_2O$, $NaH_2PO_4 \cdot H_2O$, $Na_4P_2O_7 \cdot 10H_2O$ or the like, or a lithium salt such as $Li_3PO_4$ may be effectively used in the form of a solution dissolved in an aqueous hydrochloric acid. Also, the same results are obtained when an aqueous solution of the mixture comprising $H_3PO_4$ together with CsCl, RbCl, KCl, NaCl and LiCl is used in place of the phosphate-alkali salt solution as described above.

A catalyst consisting of a copper salt and phosphoric acid or a copper salt and an alkali salt is not found to be suitable since it does not maintain its catalytic activity for a long period of time and results in a low yield of the desired product.

As a carrier for supporting the catalyst, activated alumina, silica gel, or active carbon etc., commonly employed as carriers give a low yield of the desired product and also result in the production of the by-product chlorobutene to some degree. However, when alumina which has been calcined at 1000–1300° C. or cellite is used as a carrier, the activity of the catalyst as well as the selectivity for dichlorobutene are increased whereby the production of the by-product can be markedly inhibited.

With a three-component catalyst containing lithium chloride as an alkali salt and calcined alumina as a carrier, a satisfactory conversion of butadiene into dichlorobutene and selectivity for dichlorobutene were obtained over a wide range of reaction temperatures from relatively lower temperatures to higher temperatures as shown in Table 1 of Example 1. Also, the catalyst consisting of a chloride of cesium, rubidium, potassium, sodium or the like in place of the lithium chloride use in the above catalyst supported on a calcined alumina or cellite carrier was found to have catalytic activity which is not so pronounced at a relatively lower reaction temperature as in the lithium chloride-containing catalyst but was found to produce the desired product almost free from by-products within a specific range of the reaction temperature.

It is preferable to use the alkali metal phosphate in an amount of 0.002 to 0.4 mole based on $H_3PO_4$, the alkali salt in an amount of 0.07 to 0.4 mole and the copper salt in an amount of 0.1 to 0.4 mole per 1 l. of the carrier. When phosphoric acid is used in an amount more than 0.4 mole, chlorobutene is sometimes produced in an increased amount.

In preparing the catalyst, a carrier is immersed in a hydrochloric acid solution having dissolved therein the copper salt and the phosphate salt or an aqueous solution of the copper salt, phosphoric acid and the alkali chloride, and the resulting mixture is evaporated on a water bath to dryness thereby supporting the active components on the carrier. The resulting carrier plus active components are then dried at about 110° C. for 24 hours and thereafter maintained at about 250° C. for 2 hours in a nitrogen stream to activate the catalyst.

The catalyst prepared as above is applicable to the reaction in either a fixed bed or fluidized bed. The reaction may be carried out over a wide range of temperatures, i.e., from 80° C. to 300° C., a range which is considered as relatively low for this type of reaction.

The components of the catalyst can appropriately be varied depending upon the desired product to be produced. For example, a catalyst having high selectivity for 1,4-dichlorobutene-2 can be composed of $Cu(SO_4)_2$ as a copper salt and $NaHPO_4$ as a phosphate-alkali double salt. Also, a catalyst having high selectivity for 3,4-dichlorobutene-1 can be composed of $CuCl_2$ as a copper salt and $K_3PO_4$ as a phosphate-alkali double salt.

The following examples illustrate the present invention but are not construed to limit the scope of this invention.

EXAMPLE 1

1 l. of calcined alumina was added to an aqueous solution of 0.18 mole $CuCl_2$, 0.02 mole LiCl and 0.2 mole $H_3PO_4$, and the mixture was evaporated to dryness on a water bath, dried at 110° C. for 24 hours and then treated in a nitrogen stream at 250° C. for 2 hours to prepare the catalyst. 20 ml. of the catalyst thus prepared was charged into a stainless steel reaction tube having an inside diameter of 18 mm., the tube being thermally controlled by a fluidized heating system. 20 ml./mm. of butadiene, 40 ml./mm. of hydrogen chloride and 10 ml./mm. of oxygen were then charged into the reaction tube and allowed to react together under the condition of 210 S.V. After the reaction was completed, the conversion of the charged butadiene and the selectivity of the butadiene for each of the products were calculated from the analytical value measured by a gas-chromatographic apparatus connected directly to the reaction tube. Qualitative analysis of the products was effected by separating the products from one another by means of gas chromatography and measuring the infrared spectrum on each of the products. The results obtained at various reaction temperatures were as shown in Table 1 below.

TABLE 1

| Reaction temp., °C. | Conversion of butadiene (percent) | Selectivity for chlorinated compounds (percent) | | | |
|---|---|---|---|---|---|
| | | Chlorobutene | Cis-1,4-dichlorobutene-2 | Trans-1,4-dichlorobutene-2 | 3,4-dichlorobutene-1 |
| 100 | 90.5 | 25.2 | 5.6 | 29.8 | 34.0 |
| 150 | 92.4 | 13.2 | 6.8 | 36.4 | 38.2 |
| 200 | 96.7 | 3.3 | 13.6 | 36.0 | 34.5 |
| 250 | 95.6 | 4.1 | 12.2 | 24.2 | 27.2 |

The catalyst used above is characterized in that it possesses high selectivity for the conversion of butadiene into 3,4-dichlorobutene-1 and a superior efficacy as proved by 90.5% reactivity of butadiene and 69.4% selectivity for dichlorobutenes at a lower temperature, i.e. 100° C., and 96.7% reactivity and 84.1% selectivity at 200° C. At a reaction temperature above 200° C., the amounts of carbon monooxide and carbon dioxide produced by combustion of trichlorobutene and butadiene were increased sharply, and the optimum reaction temperature was in the range of 150° C. to 200° C.

EXAMPLE 2

The percent conversion and selectivity at the optimum reaction temperature obtained through the use of four catalysts are as shown in Table 2 below. The catalysts were prepared by adding separately 0.02 mole CsCl, RbCl, KCl and NaCl as alkali salts to 0.2 mole $CuCl_2$ and 0.2 mole $H_3PO_4$ and supporting the resulting mixture on 1 l. of calcined alumina.

TABLE 2

| Catalyst | Optimum temp. (° C.) | Conversion of butadiene (percent) | Selectivity for chlorinated compounds (percent) | | | | |
|---|---|---|---|---|---|---|---|
| | | | Chlorobutene | Cis-1,4-dichlorobutene-2 | Trans-1,4-dichlorobutene-2 | 3,4-dichlorobutene-1 | Total dichlorobutene |
| $CuCl_2$-$H_3PO_4$-CsCl | 220 | 76.1 | 0 | 11.0 | 32.1 | 41.0 | 84.1 |
| $CuCl_2$-$H_3PO_4$-RbCl | 200 | 83.4 | 0.8 | 9.8 | 27.6 | 54.0 | 91.4 |
| $CuCl_2$-$H_3PO_4$-KCl | 175 | 88.2 | 1.0 | 10.2 | 27.0 | 45.3 | 82.5 |
| $CuCl_2$-$H_3PO_4$-NaCl | 200 | 84.1 | 0.9 | 8.9 | 26.3 | 46.2 | 81.4 |

By using the above catalysts, 1–2% trichlorobutene and two unidentified substances were also produced as by-products in addition to the chlorobutene and dichlorobutene.

EXAMPLE 3

The reaction was effected under the same conditions as those in Example 1 but using a catalyst consisting of 0.2 mole $CuCl_2$, 0.02 mole LiCl and 0.15 mole $H_3PO_4$ supported on 1 l. of cellite and a reaction temperature of 180° C. In this manner, 89.4% conversion of butadiene, and selectivities of 10.0% cis-1,4-dichlorobutene-2, 32.1% trans-1, 4-dichlorobutene-2 and 37.1% 3,4-dichlorobutene-1 were obtained.

EXAMPLE 4

The reaction was effected under the same conditions as those in Example 1 but using a catalyst consisting of 0.3 mole $CuCl_2$ and 0.18 mole $K_3PO_4$ supported on 1 l. of activated alumina and a reaction temperature of 180° C. In this manner, 82.3% conversion of butadiene, and selectivities of 14.9% cis-1,4-dichlorobutene-2, 52.0% trans-1, 4-dichlorobutene-2, 22.8% 3,4-dichlorobutene-1 and 8.9% chlorobutene were obtained.

The catalyst used above is characterized in that it produces a smaller amount of perchlorinated compounds and carbon monooxide and carbon dioxide whereas it shows a high selectivity for 1,4-dichlorobutene.

EXAMPLE 5

The reaction was effected under the same conditions as those in Example 1 but using a catalyst consisting of 0.2 mole $Cu(SO_4)_2$ and 0.11 mole $NaHPO_4$ supported on 1 l. of activated alumina and a temperature of 200° C. The results were as shown below:

Conversion—82.6%

Selectivity for:
   Chlorobutene, 9.4%
   Cis-1,4-dichlorobutene-2, 13.8%
   Trans-1,4-dichlorbutene-2, 48.6%
   3,4-dichlorobutene-1, 27.2%

The above results indicate that the catalyst possesses the same high selectivity for 1,4-dichlorobutene as does that used in Example 3.

What is claimed is:

1. A process for preparing dichlorobutene, which comprises immersing a carrier in an aqueous solution of (a) a copper salt selected from the group consisting of copper chloride, copper sulfate and copper nitrate, (b) phosphoric acid and (c) a chloride of an alkali metal selected from the group consisting of cesium, rubidium, potassium, sodium and lithium, evaporating the resulting mixture on a water bath to dryness whereby the active components are supported on the surface of the carrier, drying the resulting carrier plus active components at about 110° C. for 24 hours, and thereafter maintaining said carrier and active components at about 250° C. for 2 hours in a nitrogen stream to produce a catalyst, and reacting together butadiene, hydrogen chloride and oxygen at a temperature of 80° C. to 300° C. in the presence of said catalyst.

2. A process according to claim 1, in which said carrier is selected from the group consisting of calcined alumina and cellite.

3. A process for preparing dichlorobutene, which comprises reacting together butadiene, hydrogen chloride and oxygen at a temperature of 80° C. to 300° C. in the presence of a catalyst supported on a carrier, the catalyst consisting of a copper salt selected from the group consisting of copper chloride, copper sulfate and copper nitrate, and (a) a phosphate of an alkali metal selected from the group consisting of potassium, sodium and lithium or (b) phosphoric acid and a chloride of an alkali metal selected from the group consisting of cesium, rubidium, potassium, sodium and lithium.

4. A process according to claim 3, in which said copper salt is used in an amount of 0.1 to 0.4 mole per 1 l. of the carrier.

5. A process according to claim 3, in which said phosphate-alkali double salt is used in an amount of 0.02 to 0.4 mole based on $H_3PO_4$ per 1 l. of the carrier.

6. A process according to claim 3, in which said carrier is selected from the group consisting of calcined alumina and cellite.

7. A process according to claim 3, wherein said alkali metal chloride is used in an amount of 0.07 to 0.4 mole per liter of the carrier.

8. A process for preparing dichlorobutene, which comprises immersing a carrier in a hydrochloric acid solution having dissolved therein (a) a copper salt selected from the group consisting of copper chloride, copper sulfate and copper nitrate, and (b) a phosphate of an alkali metal selected from the group consisting of potassium, sodium and lithium, evaporating the resultant mixture on a water bath to dryness whereby the active components are supported on the surface of the carrier, drying the resulting carrier plus active components at about 110° C. for 24 hours, and thereafter maintaining said carrier and active components at about 250° C. for 2 hours in a nitrogen stream to produce a catalyst, and reacting together butadiene, hydrogen chloride and oxygen at a temperature of 80° C. to 300° C. in the presence of said catalyst.

9. A process according to claim 8, in which said carrier is selected from the group consisting of calcined alumina and cellite.

References Cited
UNITED STATES PATENTS 3,050,568   8/1962   Arganbright _____ 260—654

LEON ZITVER, Primary Examiner

A. SIEGEL, Assistant Examiner

U.S. Cl. X.R.

252—437